(12) United States Patent
Hsieh et al.

(10) Patent No.: US 8,804,352 B2
(45) Date of Patent: Aug. 12, 2014

(54) CIRCUIT BOARD ASSEMBLY

(75) Inventors: Ming-Hsien Hsieh, Taoyuan Hsien (TW); Kuo-Hua Lin, Taoyuan Hsien (TW); Yi-Min Chen, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 177 days.

(21) Appl. No.: 13/481,968

(22) Filed: May 29, 2012

(65) Prior Publication Data

US 2013/0176670 A1 Jul. 11, 2013

(30) Foreign Application Priority Data

Jan. 11, 2012 (TW) .............................. 101101036 A

(51) Int. Cl.
*H05K 5/00* (2006.01)

(52) U.S. Cl.
USPC . 361/752; 361/624; 361/679.33; 361/679.58; 361/715; 361/716; 361/730; 361/804; 361/810; 174/520; 257/401; 439/61; 439/62; 439/74; 439/327; 439/876

(58) Field of Classification Search
CPC ............. H05K 7/14; H05K 1/00; H05K 1/02; H05K 5/00; H05K 7/04; H05K 7/10; H05K 7/20; H01L 25/18; H01R 13/02
USPC ............... 361/752, 624, 679.33, 679.58, 715, 361/716, 730, 804, 810; 174/520; 257/401; 439/61, 62, 74, 327, 876
See application file for complete search history.

(56) References Cited

U.S. PATENT DOCUMENTS

| | | | | |
|---|---|---|---|---|
| 4,755,145 A | * | 7/1988 | Johnson et al. | 439/61 |
| 4,795,362 A | * | 1/1989 | Vonder et al. | 439/377 |
| 5,505,625 A | * | 4/1996 | Byer et al. | 439/62 |
| 5,880,592 A | * | 3/1999 | Sharpes et al. | 324/750.05 |
| 5,906,501 A | * | 5/1999 | Longueville et al. | 439/327 |
| 6,134,120 A | * | 10/2000 | Baldwin et al. | 361/804 |
| 6,264,510 B1 | * | 7/2001 | Onizuka et al. | 439/876 |
| 6,714,409 B2 | * | 3/2004 | Chen | 361/679.33 |
| 2001/0021611 A1 | * | 9/2001 | Onizuka et al. | 439/876 |
| 2002/0071640 A1 | * | 6/2002 | Rosen et al. | 385/88 |
| 2003/0096541 A1 | * | 5/2003 | Onizuka et al. | 439/876 |
| 2004/0001319 A1 | * | 1/2004 | Kawakita et al. | 361/715 |
| 2004/0229480 A1 | * | 11/2004 | Haba | 439/67 |
| 2005/0048838 A1 | * | 3/2005 | Korsunsky et al. | 439/607 |
| 2005/0159024 A1 | * | 7/2005 | Yamada et al. | 439/64 |
| 2006/0141822 A1 | * | 6/2006 | Ozawa et al. | 439/76.1 |
| 2007/0141868 A1 | * | 6/2007 | Park | 439/74 |

(Continued)

FOREIGN PATENT DOCUMENTS

| | | |
|---|---|---|
| JP | 2-35467 | 3/1990 |
| JP | 7-221418 | 8/1995 |

*Primary Examiner* — Xiaoliang Chen

(74) *Attorney, Agent, or Firm* — CKC & Partners Co., Ltd.

(57) ABSTRACT

A circuit board assembly includes a motherboard, a first daughterboard, and a first metal bar. Two ends of the first metal bar are respectively fastened to the motherboard and the first daughterboard, and are electrically connected between the motherboard and the first daughterboard. The first metal bar is supported between the motherboard and the first daughterboard, so as to position the first daughterboard separately over the motherboard and enable the first daughterboard to be substantially perpendicular to the motherboard.

13 Claims, 8 Drawing Sheets

(56) References Cited

U.S. PATENT DOCUMENTS

| | | | |
|---|---|---|---|
| 2008/0054373 A1* | 3/2008 | Chen et al. | 257/401 |
| 2008/0130252 A1* | 6/2008 | Sasaki et al. | 361/752 |
| 2008/0137267 A1* | 6/2008 | Sasaki et al. | 361/624 |
| 2008/0247133 A1* | 10/2008 | Ito | 361/687 |
| 2009/0055567 A1* | 2/2009 | Chen et al. | 710/302 |
| 2010/0163302 A1* | 7/2010 | Hashikura et al. | 174/520 |
| 2010/0265664 A1* | 10/2010 | Okumura et al. | 361/716 |
| 2011/0069457 A1* | 3/2011 | Okumura et al. | 361/716 |
| 2011/0094173 A1* | 4/2011 | Parker et al. | 52/261 |
| 2011/0228473 A1* | 9/2011 | Anderson et al. | 361/679.58 |
| 2011/0267794 A1* | 11/2011 | Anderson et al. | 361/810 |
| 2012/0048702 A1* | 3/2012 | Liu | 200/5 A |
| 2012/0113613 A1* | 5/2012 | Anderson et al. | 361/810 |
| 2012/0145983 A1* | 6/2012 | Rosicki | 256/65.03 |
| 2012/0328908 A1* | 12/2012 | Han et al. | 429/7 |

* cited by examiner

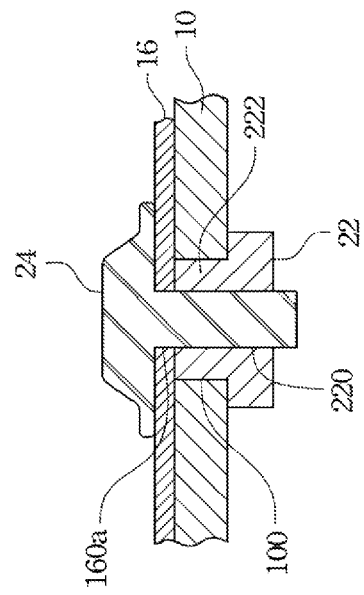
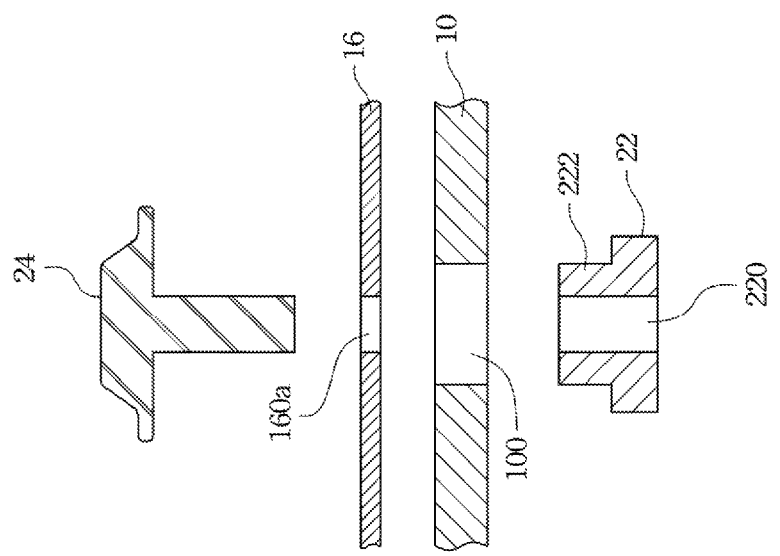
Fig. 6B
Fig. 6A

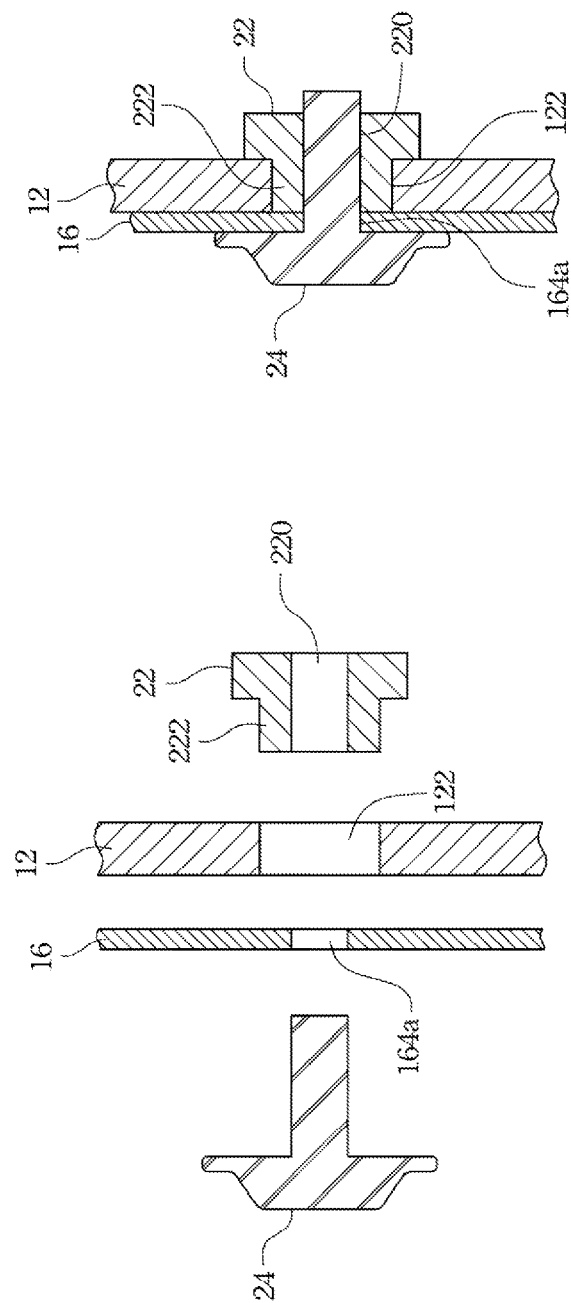

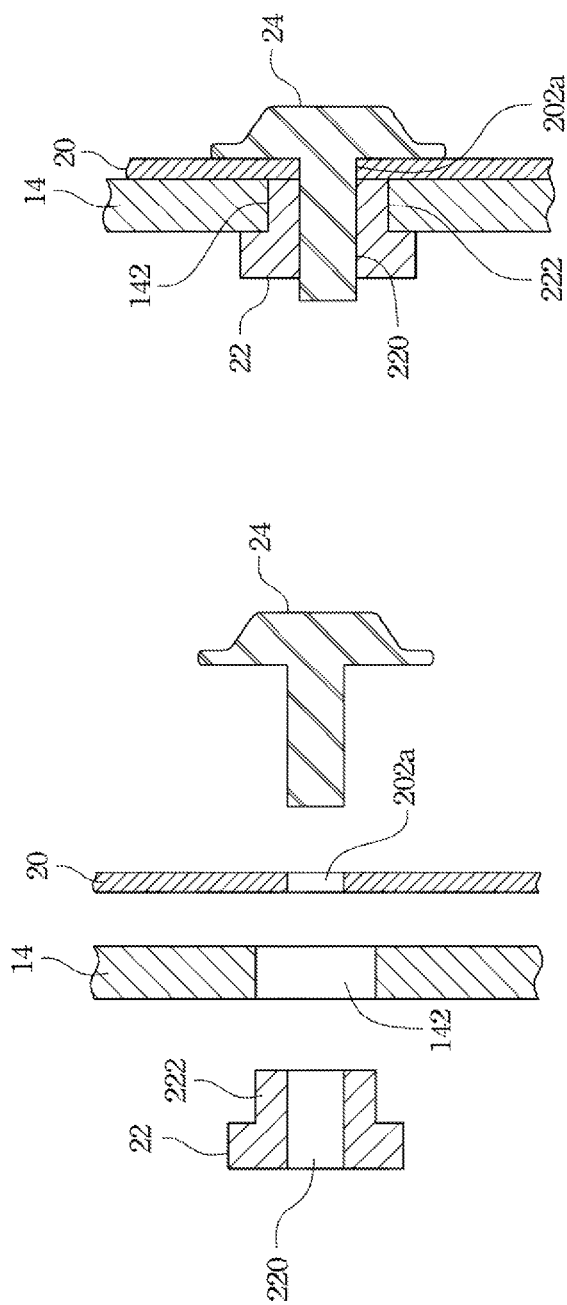

CIRCUIT BOARD ASSEMBLY

RELATED APPLICATIONS

This application claims priority to Taiwan Application Serial Number 101101036, filed Jan. 11, 2012, which is herein incorporated by reference.

BACKGROUND

1. Field of Invention

The present invention relates to a circuit board assembly

2. Description of Related Art

Nowadays, because the structure and functions of an electronic product are increasingly complicated, and the technology fields in which the electronic product is involved are getting broader, no industry can handle all aspects of the electronic product solely. Therefore, electronic products are gradually developed with the trend of modularization. Each of different industries may focus on certain technology fields and produce corresponding functional modules (such as a wireless communication module, a global positioning system module, etc.). Downstream industries thus can assemble the functional modules and provide highly integrated and multi-functional electronic products for customers.

The functional modules are usually packaged onto daughterboards. The daughterboards have a plurality of pins for connecting a motherboard. The functional modules can be assembled onto the daughterboards by any packaging technology, such as the commonest STM (Surface Mount Technology). In a conventional daughterboard, pins with jagged holes (or stamp holes) are formed at a side of the daughterboard. A side of each of the pins and solder can be connected to each other, so that the bonding strength between each of the pins and the solder is strong. Because the pins are distributed at a periphery of the daughterboard and occupy the wiring area of the daughterboard, the area of the daughterboard is decreased disadvantageously.

Furthermore, a power supply converts 110V or 220V AC (alternating current) transmitted from an external cable into 12V or ±5V DC (direct current) required by hardware devices such as a motherboard, a hard drive, a CD-ROM drive, etc. The motherboard of the power supply is used for allowing most of the electronic components to be plugged into, so that the requirement of large current and the problem of heat dissipation have to be considered especially for the electronic components with large currents (such as a capacitor).

However, in a conventional power supply including a cable management system, wires are often used as connections among circuit boards. Such wires generally need to be coarse and applied in bundles but resulting in the following problems. (1) The wires are hard to be assembled and arranged and the space is hard to be managed. (2) The manufacturing processes are difficult. (3) The worn wires affect efficiency. (4) Aesthetic issues arise.

SUMMARY

In order to solve the problems of the prior art, the invention provides an improved a circuit board assembly of which circuit boards are connected by metal bars as a conductive medium for large current. Compared with the conventional circuit board assembly using wires as a conductive medium, the circuit board assembly with a novel structure design of the invention is wireless, so that the problems of assembling and arranging wires will not occur, and the difficulty level of assembling the circuit board assembly can be reduced, and the appearance of the circuit board assembly becomes aesthetic. In addition, compared with the wires, the metal bars used in the invention have lower energy loss. Furthermore, the metal bars of the invention are mounted on circuit boards by screw-fastening for replacing the conventional welding processes, thus reducing the difficulty of manufacturing processes.

According to an embodiment of the invention, a circuit board assembly includes a motherboard, a first daughterboard, and a first metal bar. Two ends of the first metal bar are respectively fastened to the motherboard and the first daughterboard, such that the first metal bar is electrically connected between the motherboard and the first daughterboard. The first metal bar is supported between the motherboard and the first daughterboard, so as to position the first daughterboard separately over the motherboard and make the first daughterboard substantially perpendicular to the motherboard.

In an embodiment of the invention, the motherboard has an engaging hole. The first metal bar has a through hole. The circuit board assembly further includes a rivet and a fastening member. The rivet has a threaded hole and an engaging portion. The engaging portion surrounds a periphery of the threaded hole and is engaged in the engaging hole. The fastening member subsequently passes through the through hole and the engaging hole and then is fastened into the threaded hole.

In an embodiment of the invention, the first daughterboard has an engaging hole. The first metal bar has a through hole. The circuit board assembly further includes a rivet and a fastening member. The rivet has a threaded hole and an engaging portion. The engaging portion surrounds a periphery of the threaded hole and is engaged in the engaging hole. The fastening member subsequently passes through the through hole and the engaging hole, and then is fastened into the threaded hole.

In an embodiment of the invention, the first metal bar further includes a first flat portion, a second flat portion, a first supporting portion, a second supporting portion, and a first bent portion. The first flat portion is flatly mounted on the motherboard. The second flat portion is flatly mounted on the first daughterboard. The first supporting portion is connected to the first flat portion and is substantially perpendicular to the motherboard. The second supporting portion is connected to the second flat portion and is substantially perpendicular to the first daughterboard. The first bent portion is connected between the first supporting portion and the second supporting portion.

In an embodiment of the invention, a radius of curvature of the first bent portion is greater than 3 mm.

In an embodiment of the invention, the second flat portion further includes at least one claw portion for inserting into the first daughterboard.

In an embodiment of the invention, the first daughterboard includes a first pin located at a side of the first daughterboard. The circuit board assembly further includes a second daughterboard and a second metal bar. The second daughterboard includes a second pin located at a side of the second daughterboard. The second metal bar has a first bridging slot and a second bridging slot. The first pin and the second pin respectively bridges the first bridging slot to the second bridging slot, so as to make the second metal bar electrically connected between the first daughterboard and the second daughterboard. The second metal bar is supported between the first daughterboard and the second daughterboard and makes the second daughterboard substantially parallel to the first daughterboard.

In an embodiment of the invention, the circuit board assembly further includes a third metal bar which is fastened to the second daughterboard and is directly inserted into the motherboard such that the third metal bar is electrically connected between the motherboard and the second daughterboard. The third metal bar is supported between the motherboard and the second daughterboard, so as to position the second daughterboard separately over the motherboard and make the second daughterboard substantially perpendicular to the motherboard.

In an embodiment of the invention, the second daughterboard has an engaging hole. The first metal bar has a through hole. The circuit board assembly further includes a rivet and a fastening member. The rivet has a threaded hole and an engaging portion. The engaging portion surrounds a periphery of the threaded hole and is engaged in the engaging hole. The fastening member subsequently passes through the through hole and the engaging hole and then is fastened into the threaded hole.

In an embodiment of the invention, the third metal bar further includes an inserting portion, a third flat portion, a third supporting portion, and a second bent portion. The inserting portion is perpendicularly inserted into the motherboard. The third flat portion is flatly mounted on the second daughterboard. The third supporting portion is connected to the third flat portion and is substantially perpendicular to the second daughterboard. The second bent portion is connected between the inserting portion and the third supporting portion.

In an embodiment of the invention, a radius of curvature of the second bent portion is greater than 3 mm.

In an embodiment of the invention, the third flat portion further includes at least one claw for inserting into the second daughterboard.

In an embodiment of the invention, the first metal bar, the second metal bar, and the third metal bar are about 1.8-1.0 mm in thickness.

In an embodiment of the invention, a material forming the first metal bar, the second metal bar, and the third metal bar includes copper.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 6A is a partial cross-sectional view of the circuit board assembly in FIG. 1, wherein the first metal bar has not yet been fastened to the motherboard;

FIG. 6B is a partial cross-sectional view of the circuit board assembly in FIG. 1, wherein the first metal bar has fastened to the motherboard;

FIG. 7A is a partial cross-sectional view of the circuit board assembly in FIG. 1, wherein the first metal bar has not yet been fastened to the first daughterboard;

FIG. 7B is a partial cross-sectional view of the circuit board assembly in FIG. 1, wherein the first metal bar has been fastened to the first daughterboard;

FIG. 8A is a partial cross-sectional view of the circuit board assembly in FIG. 2, wherein the third metal bar has not yet been fastened to the second daughterboard; and FIG. 8B is a partial cross-sectional view of the circuit board assembly in FIG. 2, wherein the third metal bar has been fastened to the second daughterboard.

DETAILED DESCRIPTION

Figure 1:
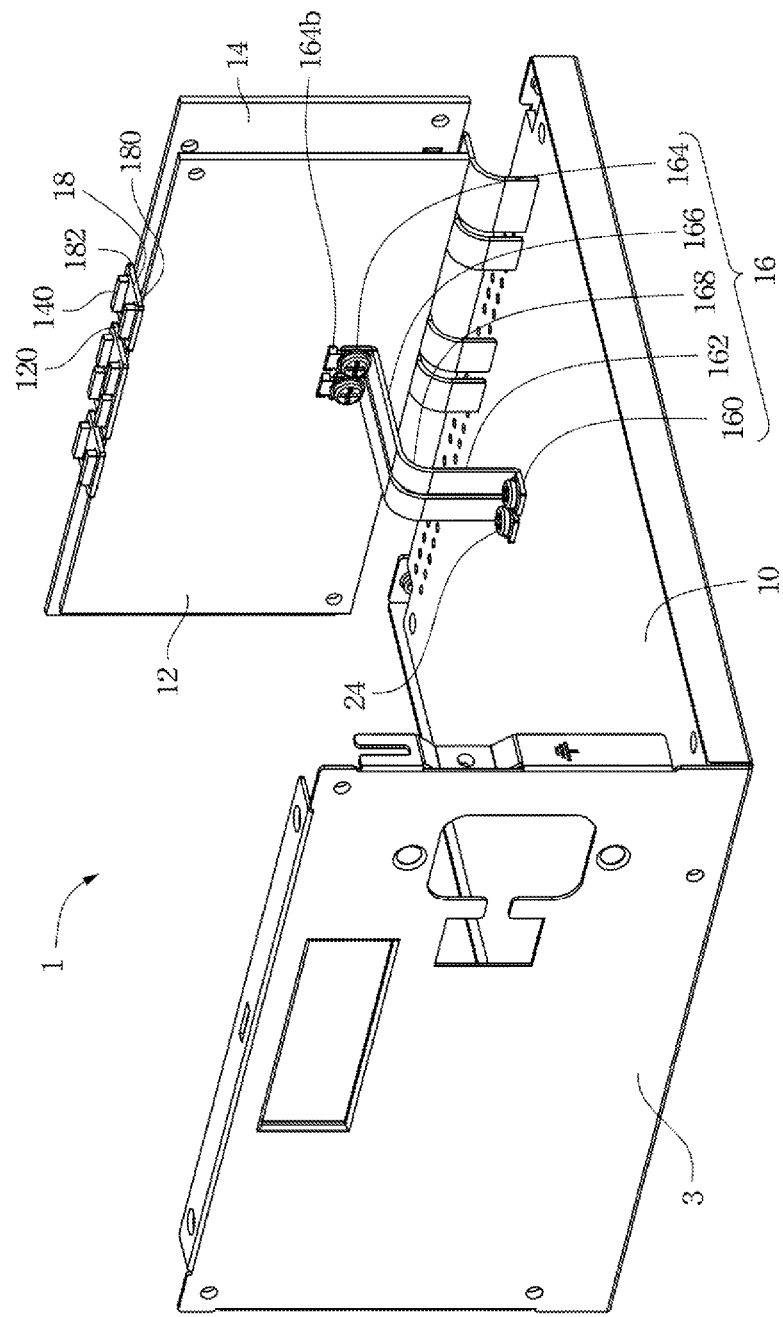
FIG. 1 is a perspective view of a circuit board assembly according to an embodiment of the invention, wherein the circuit board assembly is assembled on a housing.

Reference will now be made in detail to the present embodiments of the invention, examples of which are illustrated in the accompanying drawings. Wherever possible, the same reference numbers are used in the drawings and the description to refer to the same or like parts.

An improved circuit board assembly is provided. Circuit boards of the circuit board assembly are connected by metal bars as a conductive medium for large current. Compared with the conventional circuit board assembly using wires as a conductive medium, the circuit board assembly with a novel structure design of the invention is wireless, so that the problems of assembling and arranging wires will not occur, and the difficulty of assembling the circuit board assembly can be reduced, and the appearance of the circuit board assembly becomes aesthetic. In addition, compared with the wires, the metal bars used in the invention have lower energy loss. Furthermore, the metal bars of the invention are mounted on circuit boards by screw-fastening for replacing the conventional welding processes, thus reducing the difficulty level of manufacturing processes.

Figure 2:
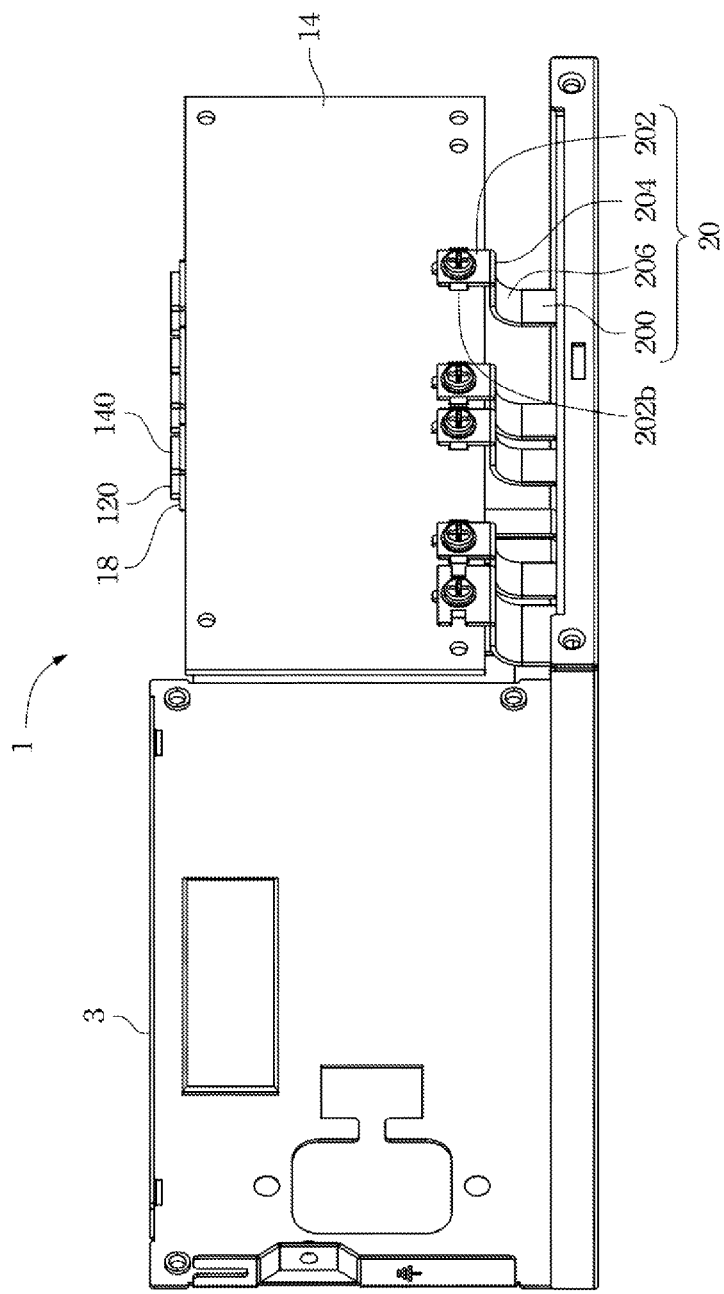
FIG. 2 is another perspective view of the circuit board assembly in FIG. 1.
Figure 3:
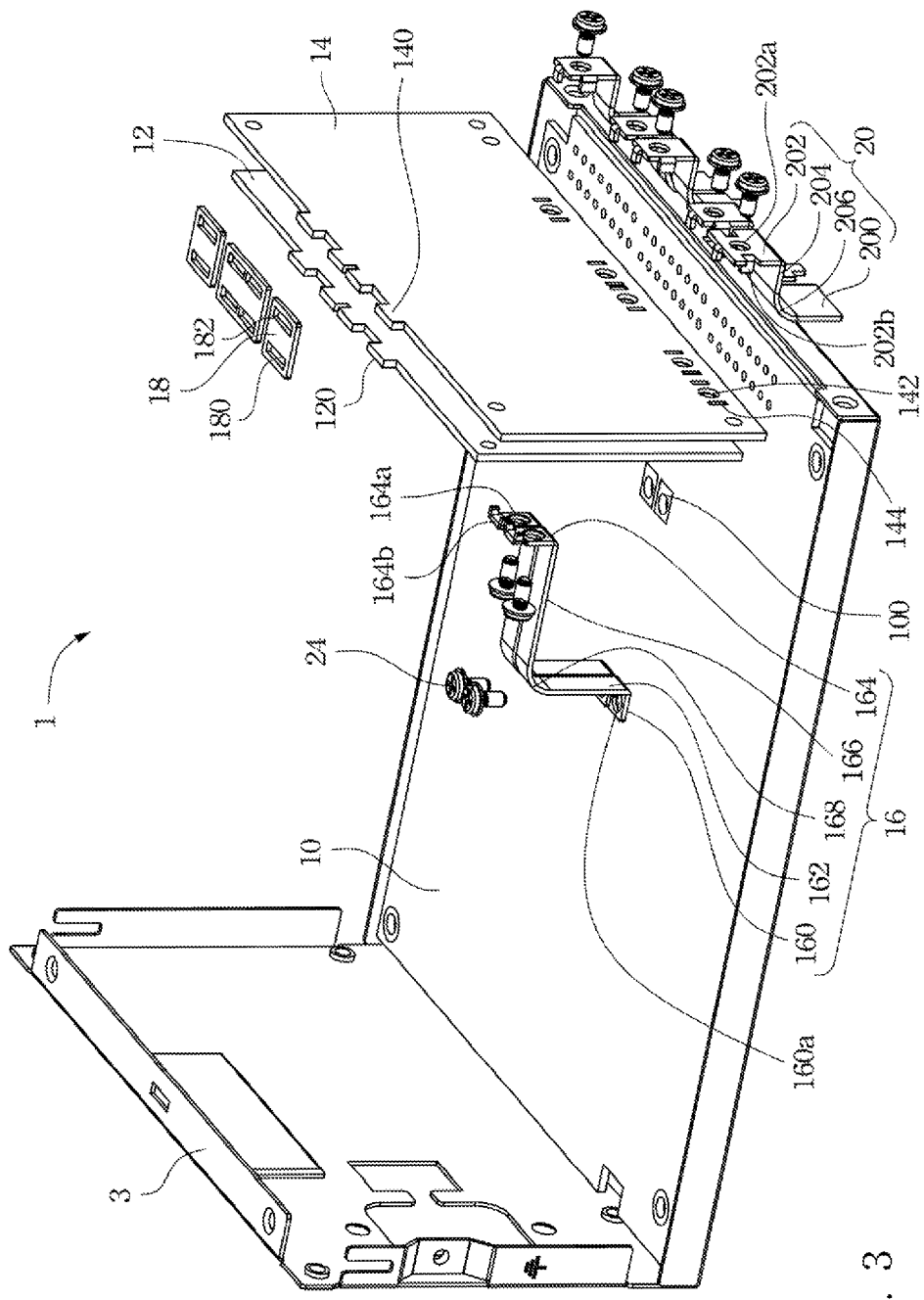
FIG. 3 is an exploded view of the circuit board assembly in FIG. 1.
Figure 4:
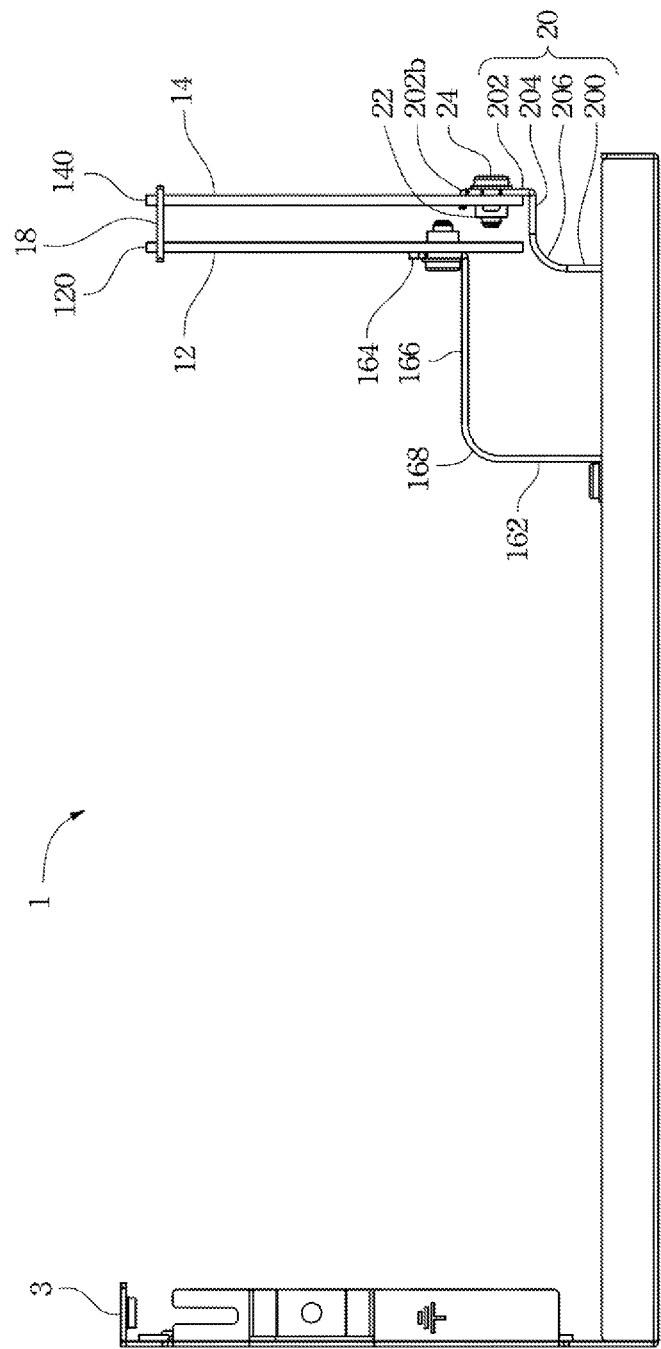
FIG. 4 is a side view of the circuit board assembly in FIG. 1.
Figure 5:
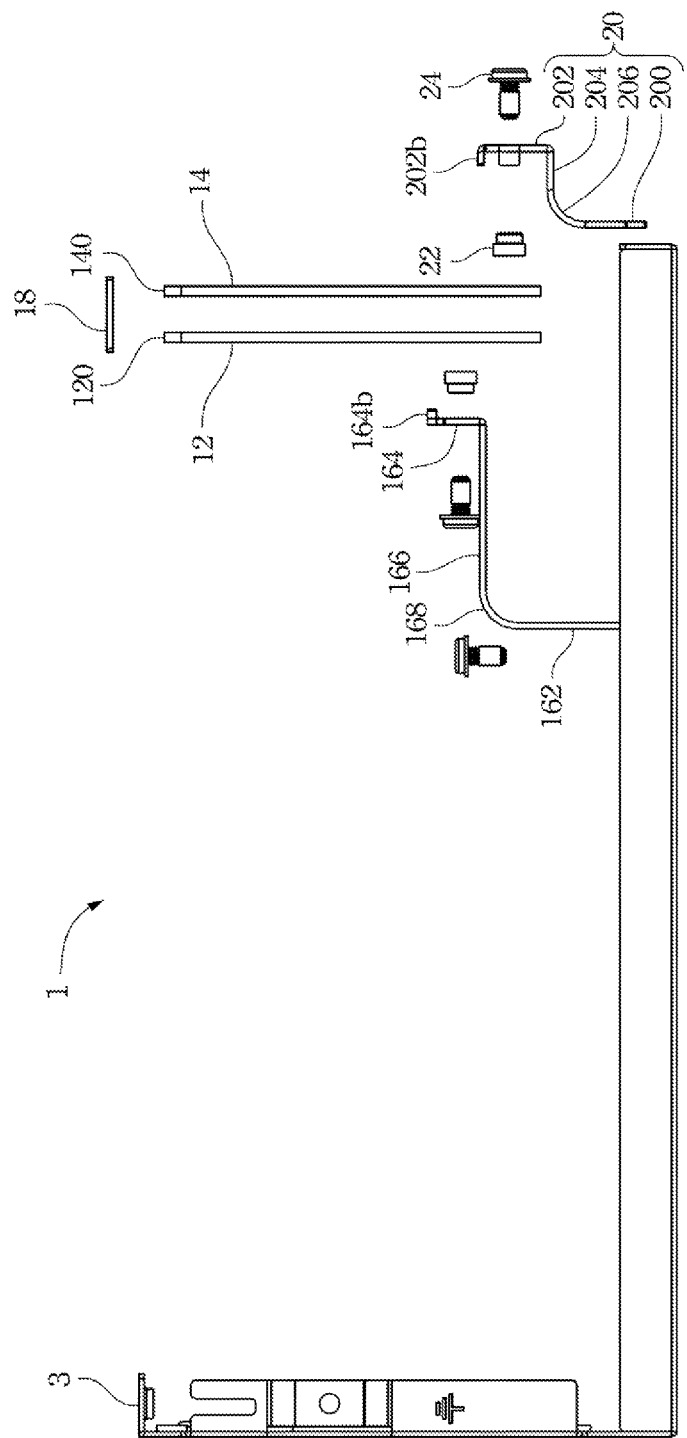
FIG. 5 is an exploded view of the circuit board assembly in FIG. 4.

FIG. 1 is a perspective view of a circuit board assembly 1 according to an embodiment of the invention, wherein the circuit board assembly 1 is assembled on a housing 3. FIG. 2 is another perspective view of the circuit board assembly 1 in FIG. 1. FIG. 3 is an exploded view of the circuit board assembly 1 in FIG. 1. FIG. 4 is a side view of the circuit board assembly 1 in FIG. 1. FIG. 5 is an exploded view of the circuit board assembly 1 in FIG. 4.

As shown in FIG. 1 to FIG. 5, the circuit board assembly 1 of the invention can be used in a power supply and assembled in the housing 3, but the invention is not limited thereto. That is, the circuit board assembly 1 of the invention is applicable to any electronic product in which a plurality of circuit boards are required to be assembled.

As shown in FIG. 1 and FIG. 3, the circuit board assembly 1 includes a motherboard 10, a first daughterboard 12, and a first metal bar 16. Two ends of the first metal bar 16 of the circuit board assembly 1 are respectively fastened to the motherboard 10 and the first daughterboard 12, such that the first metal bar 16 is electrically connected between the motherboard 10 and the first daughterboard 12. The first metal bar 16 of the circuit board assembly 1 is supported between the motherboard 10 and the first daughterboard 12, so as to position the first daughterboard 12 separately over the motherboard 10 and make the first daughterboard 12 substantially perpendicular to the motherboard 10.

As shown in FIG. 1 and FIG. 3, the first metal bar 16 of the circuit board assembly 1 further includes a first flat portion 160, a second flat portion 164, a first supporting portion 162 a second supporting portion 166, and a first bent portion 168. The first flat portion 160 of the first metal bar 16 is flatly mounted on the motherboard 10. The second flat portion 164 of the first metal bar 16 is flatly mounted on the first daughterboard 12. The first supporting portion 162 of the first metal bar 16 is connected to the first flat portion 160 and is substantially perpendicular to the motherboard 10. The second supporting portion 166 of the first metal bar 16 is connected to the second flat portion 164 and is substantially perpendicular to the first daughterboard 12. The first bent portion 168 of the first metal bar 16 is connected between the first supporting portion 162 and the second supporting portion 166. That is, the first flat portion 160 and the first supporting portion 162 that are connected to each other substantially form an L-shape, and the second flat portion 164 and the second supporting portion 166 that are connected to each other substantially form an L-shape, and the first supporting portion 162, the first bent portion 168, and the second supporting portion 166 that are connected substantially form an L-shape. Because having sufficient structural strength, the first metal bar 16 of the circuit board assembly 1 can achieve the purpose of supporting the first daughterboard 12 to be separately located over the motherboard 10. In other words, the first metal bar 16 of the circuit board assembly 1 not only can be the conductive medium between the motherboard 10 and the first daughterboard 12, but also can be supported between the motherboard 10 and the first daughterboard 12 so as to effectively utilize the space between the motherboard 10 and the first daughterboard 12 (for example, other electronic components can be inserted into the motherboard 10 at the space under the first daughterboard 12) for increasing the space utilization of the housing 3.

FIG. 6A is a partial cross-sectional view of the circuit board assembly 1 in FIG. 1, wherein the first metal bar 16 has not yet been fastened to the motherboard 10. FIG. 6B is a partial cross 0 sectional view of the circuit board assembly 1 in FIG. 1, wherein the first metal bar 16 has been fastened to the motherboard 10.

As shown in FIG. 6A and FIG. 6B, the motherboard 10 of the circuit board assembly 1 has an engaging hole 100. The first metal bar 16 of the circuit board assembly 1 has a through hole 160a. Particularly, the through hole 160a of the first metal bar 16 is located on the first flat portion 160. The circuit board assembly 1 further includes a rivet 22 and a fastening member 24 (such as a screw). The rivet 22 of the circuit board assembly 1 has a threaded hole 220 and an engaging portion 222. The engaging portion 222 of the rivet 22 surrounds a periphery of the threaded hole 220 and is engaged in the engaging hole 100 of the motherboard 10 (i.e., the engaging portion 222 of the rivet 2 and the engaging hole 100 of the motherboard 10 form an interference fit). The fastening member 24 of the circuit board assembly 1 subsequently passes through the through hole 160a of the first metal bar 16 and the engaging hole 100 of the motherboard 10 and then is fastened into the threaded hole 220 of the rivet 22. Therefore, an assembly worker may easily fasten the first metal bar 16 to the motherboard 1 by fastening the fastening member 24 from the front side of the first metal bar 16.

FIG. 7A is a partial cross-sectional view of the circuit board assembly 1 in FIG. 1, wherein the first metal bar 16 has not yet been fastened to the first daughterboard 12. FIG. 7B is a partial cross-sectional view of the circuit board assembly 1 in FIG. 1, wherein the first metal bar 16 has been fastened to the first daughterboard 12.

As shown in FIG. 7A and FIG. 7B, the first daughterboard 12 of the circuit board assembly 1 has an engaging hole 122. The first metal bar 16 of the circuit board assembly 1 has a through hole 164a. Particularly, the through hole 164a of the first metal bar 16 is located on the second flat portion 164. The circuit board assembly 1 further includes a rivet 22 and a fastening member 24 (such as a screw). The rivet 22 of the circuit board assembly 1 has a threaded hole 220 and an engaging portion 222. The engaging portion 222 of the rivet 22 surrounds the periphery of the threaded hole 220 and is engaged in the engaging hole 122 of the first daughterboard 12 (i.e., the engaging portion 222 of the rivet 2 and the engaging hole 122 of the first daughterboard 12 form an interference fit). The fastening member 24 of the circuit board assembly 1 subsequently passes through the through hole 164a of the first metal bar 16 and the engaging hole 122 of the first daughterboard 12 and then is fastened into the threaded hole 220 of the rivet 22. Therefore, an assembly worker may easily fasten the first metal bar 16 to the first daughterboard 12 by fastening the fastening member 24 from the front side of the first metal bar 16.

In addition, as shown in FIG. 1, FIG. 3, and FIG. 5, in order to increase the mounting strength between the first metal bar 16 and the first daughterboard 12, the second flat portion 164 of the first metal bar 16 further includes at least one claw portion 164b. The claw portion 164b of the second flat portion 164 is extended from the edge of the second flat portion 164 and can be inserted into a claw hole (not shown) of the first daughterboard 12, so as to enhance the mounting strength between the first metal bar 16 and the first daughterboard 12. The quantity of the claw portion 164b of the second flat portion 164 can be adjusted according to practical requirements.

In the embodiment of the invention, the quantity of the first metal bar 16 that is used in the circuit board assembly 1 is two, but the invention is not limited thereto and can be adjusted according to practical requirements.

In an embodiment of the invention, the first metal bar 16 of the circuit board assembly 1 can be welded to the motherboard 10 and the first daughterboard 12 respectively with the first flat portion 160 and the second flat portion 164.

As shown in FIG. 1 and FIG. 3, the first daughterboard 12 of the circuit board assembly 1 includes a first pin 120 located at a side of the first daughterboard 120. The circuit board assembly 1 further includes a second daughterboard 14 and a second metal bar 18. The second daughterboard 14 of the circuit board assembly 1 includes a second pin 140 located at a side of the second daughterboard 14. The second metal bar 18 of the circuit board assembly 1 has a first bridging slot 180 and a second bridging slot 182. The first pin 120 of the first daughterboard 12 and the second pin 140 of the second daughterboard 14 respectively bridge the first bridging slot 180 to the second bridging slot 182 of the second metal bar 18, so as to make the second metal bar 18 electrically connected between the first daughterboard 12 and the second daughterboard 14. The second metal bar 18 of the circuit board assembly 1 is supported between the first daughterboard 12 and the second daughterboard 14 and makes the second daughterboard 14 substantially parallel to the first daughterboard 12 (i.e., to make the first daughterboard 12 and the second daughterboard 14 be side by side). In other words, the second metal bar 18 of the circuit board assembly 1 not only can be the conductive medium between the first daughterboard 12 and the second daughterboard 14, but also can be supported between the first daughterboard 12 and the second daughterboard 14 so as to effectively utilize the space between the first daughterboard 12 and the second daughterboard 14 (for example, other electronic components can be inserted respectively into surfaces of the first daughterboard 12 and the second daughterboard 14 that face to each other), thus increasing the space utilization of the housing 3.

In the embodiment of the invention, after the first pin 120 of the first daughterboard 12 and the second pin 140 of the second daughterboard 14 respectively bridge the first slot 180 to the second slot 182 of the second metal bar 18, a welding process can be further applied to enhance the mounting strength among the first daughterboard 12, the second metal bar 18, and the second daughterboard 14.

In the embodiment of the invention, the quantity of the second metal bar 18 used in the circuit board assembly 1 is three, but the invention is not limited thereto and can be adjusted according to practical requirements. Similarly, the quantity of the first slot 180 and that of the second slot 182 of the second metal bar 18 can be adjusted respectively according to the quantity of the first pin 120 of the first daughterboard 12 and that of the second pin 140 of the second daughterboard 14.

As shown in FIG. 2 and FIG. 3, the circuit board assembly 1 further includes a third metal bar 20. The third metal bar 20 of the circuit board assembly 1 is fastened to the second daughterboard 14 and directly inserted into the motherboard 10, so as to be electrically connected between the motherboard 10 and the second daughterboard 14. The third metal bar 20 of the circuit board assembly 1 is supported between the motherboard 10 and the second daughterboard 14, so as to position the second daughterboard 14 separately over the motherboard 10 and make the second daughterboard 14 substantially perpendicular to the motherboard 10.

As shown in FIG. 2 and FIG. 3, the third metal bar 20 of the circuit board assembly 1 further includes an inserting portion 200, a third flat portion 202, a third supporting portion 204, and a second bent portion 206. The inserting portion 200 of the third metal bar 20 is perpendicularly inserted into the motherboard 10. The third flat portion 202 of the third metal bar 20 is flatly mounted on the second daughterboard 14. The third supporting portion 204 of the third metal bar 20 is connected to the third flat portion 202 and is substantially perpendicular to the second daughterboard 14. The second bent portion 206 of the third metal bar 20 is connected between the inserting portion 200 and the third supporting portion 204. That is, the third flat portion 202 and the third supporting portion 204 that are connected to each other substantially form an L-shape, and the insertion portion 200, the second bent portion 206, and the third supporting portion 204 that are connected substantially form an L-shape. Because of having sufficient structural strength, the third metal bar 20 of the circuit board assembly 1 can achieve the purpose of supporting the second daughterboard 14 to be separately located over the motherboard 10. In other words, the third metal bar 20 of the circuit board assembly 1 not only can be the conductive medium between the motherboard 10 and the second daughterboard 14 but also can be supported between the motherboard 10 and the second daughterboard 14 so as to effectively utilize the space between the motherboard 10 and the second daughterboard 14 (for example, other electronic components can be inserted on the motherboard 10 at the space under the second daughterboard 14), thus increasing the space utilization of the housing 3.

FIG. 8A is a partial cross-sectional view of the circuit board assembly 1 in FIG. 2, wherein the third metal bar 20 has not yet been fastened to the second daughterboard 14. FIG. 8B is a partial cross-sectional view of the circuit board assembly 1 in FIG. 2, wherein the third metal bar 20 has been fastened to the second daughterboard 14.

As shown in FIG. 8A and FIG. 8B, the second daughterboard 14 of the circuit board assembly 1 has an engaging hole 142. The third metal bar 20 of the circuit board assembly 1 has a through hole 202a. Particularly, the through hole 202a of the third metal bar 20 is located on the third flat portion 202. The circuit board assembly 1 further includes a rivet 22 and a fastening member 24. The rivet 22 of the circuit board assembly 1 has a threaded hole 220 and an engaging portion 222. The engaging portion 222 of the rivet 22 surrounds the periphery of the threaded hole 220 and is engaged in the engaging hole 142 of the second daughterboard 14 (i.e., the engaging portion 222 of the rivet 2 and the engaging hole 142 of the second daughterboard 14 form an interference fit). The fastening member 24 of the circuit board assembly 1 subsequently passes through the through hole 202a of the third metal bar 20 and the engaging hole 142 of the second daughterboard 14, and then is fastened into the threaded hole 220 of the rivet 22. Therefore, an assembly worker may easily fasten the third metal bar 20 to the second daughterboard 14 by fastening the fastening member 24 from the front side of the third metal bar 14.

In addition, as shown in FIG. 2, FIG. 3, and FIG. 5, in order to increase the mounting strength between the third metal bar 20 and the second daughterboard 14, the third flat portion 202 of the third metal bar 20 further includes at least one claw portion 202b. The claw portion 202b of the third flat portion 202 is extended from the edge of the third flat portion 202 and can be inserted into a claw hole 144 of the second daughterboard 14, so as to enhance the mounting strength between the third metal bar 20 and the second daughterboard 14. The quantity of the claw portion 202b of the third flat portion 202 can be adjusted according to practical requirements.

In the embodiment of the invention, the quantity of the third metal bar 20 used in the circuit board assembly 1 is four, but the invention is not limited thereto and can be adjusted according to practical requirements.

In an embodiment of the invention, in order to prevent the third metal bar 20 of the circuit board assembly 1 from having the problem of stress concentration during manufacturing, the radius of curvature of the second bent portion 206 that is connected between the insertion portion 200 and the third supporting portion 204 can be designed to be greater than about 3 mm, but the invention is not limited thereto.

In an embodiment of the invention, the third metal bar 20 of the circuit board assembly 1 can be mounted to the second daughterboard 14 by welding the third flat portion 202 to the second daughterboard 14.

In an embodiment of the invention, the first metal bar 16, the second metal bar 18, and the third metal bar 20 of the circuit board assembly 1 are preferably about 1.8-1.0 mm in thickness, but the invention is not limited thereto. In another embodiment of the invention, the second metal bar 18, and the third metal bar 20 of the circuit board assembly 1 can also achieve the functions of conducting currents and supporting with the thickness within a range about 0.5-2.0 mm.

In an embodiment of the invention, the material forming the first metal bar 16, the second metal bar 18, and the third metal bar 20 of the circuit board assembly 1 includes copper, but the invention is not limited thereto. For example, a tin plating process can be applied to the surface of the first metal bar 16, the surface of the second metal bar 18, and the surface of the third metal bar 20 of the circuit board assembly 1.

According to the foregoing recitations of the embodiments of the invention, it can be seen that circuit boards of the circuit board assembly of the invention are connected by metal bars as a conductive medium for large current. Compared with the conventional circuit board assembly using wires as a conductive medium, the circuit board assembly with the novel structure design of the invention is wireless, so that the problems of assembling and arranging wires do not occur, and the difficulty level of assembling the circuit board assembly can be reduced, and the appearance of the circuit board assembly becomes aesthetic. In addition, compared with the wires, the metal bars used in the invention have lower energy loss. Furthermore, the metal bars of the invention are mounted on circuit boards by screw-fastening for replacing the conventional welding processes, thus reducing the difficulty of manufacturing processes.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A circuit board assembly comprising:
   a motherboard having a first engaging hole;
   a first daughterboard;
   a first metal bar of which two ends are respectively fastened to the motherboard and the first daughterboard, such that the first metal bar is electrically connected between the motherboard and the first daughterboard, and the first metal bar has a first through hole;
   a first rivet having a first threaded hole and a first engaging portion, wherein the first engaging portion surrounds a periphery of the first threaded hole and is engaged in the first engaging hole; and
   a first fastening member fastened into the first threaded hole after subsequently passing through the first through hole and the first engaging hole,
   wherein the first metal bar is supported between the motherboard and the first daughterboard, so as to position the first daughterboard separately over the motherboard and make the first daughterboard substantially perpendicular to the motherboard.

2. The circuit board assembly of claim 1, wherein the first daughterboard has a second engaging hole, and the first metal bar has a second through hole, and the circuit board assembly further comprises:
   a second rivet having a second threaded hole and a second engaging portion, wherein the second engaging portion surrounds a periphery of the second threaded hole and is engaged in the second engaging hole; and
   a second fastening member fastened into the second threaded hole after subsequently passing through the second through hole and the second engaging hole.

3. The circuit board assembly of claim 1, wherein the first metal bar further comprises:
   a first flat portion flatly attached to the motherboard;
   a second flat portion flatly attached the first daughterboard;
   a first supporting portion which is connected to the first flat portion and is substantially perpendicular to the motherboard;
   a second supporting portion which is connected to the second flat portion and is substantially perpendicular to the first daughterboard; and
   a first bent portion connected between the first supporting portion and the second supporting portion.

4. The circuit board assembly of claim 3, wherein a radius of curvature of the first bent portion is greater than 3 mm.

5. The circuit board assembly of claim 3, wherein the second flat portion further comprises at least one claw portion for inserting into the first daughterboard.

6. The circuit board assembly of claim 1, wherein the first daughterboard comprises a first pin located at a side of the first daughterboard, and the circuit board assembly further comprises:
   a second daughterboard comprising a second pin located at a side of the second daughterboard; and
   a second metal bar having a first bridging slot and a second bridging slot, wherein the first pin and the second pin respectively bridge the first bridging slot to the second bridging slot, so as to make the second metal bar electrically connected between the first daughterboard and the second daughterboard,
   wherein the second metal bar is supported between the first daughterboard and the second daughterboard to make the second daughterboard substantially parallel to the first daughterboard.

7. The circuit board assembly of claim 6, further comprising a third metal bar which is fastened to the second daughterboard and is directly inserted into the motherboard such that the third metal bar is electrically connected between the motherboard and the second daughterboard, wherein the third metal bar is supported between the motherboard and the second daughterboard, so as to position the second daughterboard separately over the motherboard and make the second daughterboard substantially perpendicular to the motherboard.

8. The circuit board assembly of claim 7, wherein the second daughterboard has a third engaging hole, and the third metal bar has a third through hole, and the circuit board assembly further comprises:
   a third rivet having a third threaded hole and a third engaging portion, wherein the third engaging portion surrounds the periphery of the third threaded hole and is engaged in the third engaging hole; and
   a third fastening member fastened into the third threaded hole after subsequently passing through the third through hole and the third engaging hole.

9. The circuit board assembly of claim 7, wherein the third metal bar further comprises:
   an inserting portion perpendicularly inserted into the motherboard;
   a third flat portion flatly mounted on the second daughterboard;
   a third supporting portion which is connected to the third flat portion and is substantially perpendicular to the second daughterboard; and
   a second bent portion connected between the inserting portion and the third supporting portion.

10. The circuit board assembly of claim 9, wherein a radius of curvature of the second bent portion is greater than 3 mm.

11. The circuit board assembly of claim 9, wherein the third flat portion further comprises at least one claw for inserting into the second daughterboard.

12. The circuit board assembly of claim 7, wherein the first metal bar, the second metal bar, and the third metal bar are substantially 1.8-1.0 mm in thickness.

13. The circuit board assembly of claim 7, a material forming the first metal bar, the second metal bar, and the third metal bar comprises copper.

* * * * *